United States Patent
Kane-Parry et al.

(10) Patent No.: US 10,708,256 B1
(45) Date of Patent: Jul. 7, 2020

(54) IDENTIFICATION OF TRUSTED CERTIFICATES

(71) Applicant: Amazon Technologies, Inc., Seattle, WA (US)

(72) Inventors: David James Kane-Parry, Seattle, WA (US); David Alan Blunt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/882,120

(22) Filed: Oct. 13, 2015

(51) Int. Cl.
*H04L 29/06* (2006.01)

(52) U.S. Cl.
CPC ........ *H04L 63/0823* (2013.01); *H04L 63/061* (2013.01); *H04L 63/064* (2013.01)

(58) Field of Classification Search
CPC .. H04L 63/0823; H04L 63/061; H04L 63/064
See application file for complete search history.

(56) References Cited

U.S. PATENT DOCUMENTS

| | | | | |
|---|---|---|---|---|
| 2002/0087859 A1* | 7/2002 | Weeks | ................... | G06F 21/604 713/156 |
| 2002/0169954 A1* | 11/2002 | Bandini | ................. | G06Q 10/00 713/153 |
| 2003/0188156 A1* | 10/2003 | Yasala | ................. | H04L 63/0823 713/156 |
| 2003/0212888 A1* | 11/2003 | Wildish | ................. | G06Q 30/06 713/158 |
| 2005/0154918 A1* | 7/2005 | Engberg | ................ | H04L 9/3268 726/4 |
| 2006/0112419 A1* | 5/2006 | Brown | ................ | H04L 63/0428 726/5 |
| 2006/0143700 A1* | 6/2006 | Herrmann | ........... | H04L 63/0823 726/14 |

(Continued)

OTHER PUBLICATIONS

Vyshegorodtsev et al., Reputation Scoring System Using an Economic Trust: Evaluate Trusted Third Parties on the Internet, 2013, IEEE, 2013 27th Internl Conf on Advanced Information Networking and Applications Workshops (Year: 2013).*

(Continued)

*Primary Examiner* — Luu T Pham
*Assistant Examiner* — Harvey I Cohen
(74) *Attorney, Agent, or Firm* — Davis Wright Tremaine LLP

(57) ABSTRACT

A certificate manager allows a particular entity such as an individual computer system, computer application, or network service, to define a customized set of rules that are used to identify digital certificates that are trusted by the particular entity. When a digital certificate is presented to the entity, the certificate manager determines whether the digital certificate is trustworthy by examining the characteristics of the certificate such as the expiration of the certificate, the characteristics of the certificate authorities that signed the digital certificate, or the signing algorithms used to generate the digital signatures on the certificate. The certificate manager may be combined with trusted root CA stores, pinned certificate stores, and other certificate management systems to define a customized set of potentially trusted certificates based on the characteristics of the particular entity.

19 Claims, 9 Drawing Sheets

(56) References Cited

U.S. PATENT DOCUMENTS

| | | | | |
|---|---|---|---|---|
| 2007/0094493 | A1* | 4/2007 | Ali | G06F 21/34 713/156 |
| 2010/0031028 | A1* | 2/2010 | Adams | H04L 9/3263 713/156 |
| 2010/0205429 | A1* | 8/2010 | Alrabady | H04L 63/0823 713/156 |
| 2010/0275014 | A1* | 10/2010 | Kelley | G06F 21/51 713/157 |
| 2013/0117558 | A1* | 5/2013 | Metke | G06F 21/33 713/156 |
| 2013/0290725 | A1* | 10/2013 | Hogan | H04L 9/3268 713/176 |
| 2015/0150141 | A1* | 5/2015 | Szymanski | G06F 40/197 726/26 |
| 2015/0180904 | A1* | 6/2015 | Kennedy | G06F 21/57 726/1 |
| 2015/0326399 | A1* | 11/2015 | Nigriny | H04L 9/3263 713/156 |

OTHER PUBLICATIONS

Mohri et al., Certificate Chain Discovery in Web of Trust for Ad Hoc Networks, IEEE, 2007 vol. 2, 21st Internl Conf on Advanced Information Networking and Applications Workshops AINAW07 (Year: 2007).*

Long et al., Application-oriented cross-CA certificate trust, IEEE, 2010, IEEE InternI Conf on Information Theory and and Information Security (Year: 2010).*

Mavrogiannopoulos, N., "Using OpenPGP Keys for Transport Layer Security (TLS) Authentication," Request for Comments: 5081, Experimental, Nov. 2007, 9 pages.

Phelan, T., "Datagram Transport Layer Security (DTLS) over the Datagram Congestion Control Protocol (DCCP)," Request for Comments: 5238, Standards Track, May 2008, 11 pages.

Dierks, T., and E. Rescorla, "The Transport Layer Security (TLS) Protocol Version 1.2," Request for Comments: 5246, Standards Track, Aug. 2008, 98 pages.

Cooper, D., et al., "Internet X509 Public Key Infrastructure Certificate and Certificate Revocation List (CRL) Profile," Request for Comments: 5280, Standards Track, 141 pages.

Salowey, J., et al., "AES Galois Counter Mode (GCM) Cipher Suites for TLS," Request for Comments: 5288, Standards Track, Aug. 2008, 9 pages.

Rescorla, E., "TLS Elliptic Curve Cipher Suites with SHA-256/384 and AES Galois Counter Mode (GCM)," Request for Comments: 5289, Informational, Aug. 2008, 7 pages.

Igoe, K., and J. Solinas, "AES Galois Counter Mode for the Secure Shell Transport Layer Protocol," Request for Comments: 5647, Informational, Aug. 2009, 10 pages.

Stebiula, D., and J. Green, "Elliptic Curve Algorithm Integration in the Secure Shell Transport Layer," Request for Comments: 5656, Standards Track, Dec. 2009, 19 pages.

Rescorla, E., et al., "Transport Layer Security (TLS) Renegotiation Indication Extension," Request for Comments: 5746, Standards Track, Feb. 2010, 16 pages.

McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.

Brown, M., and R. Housley, "Transport Layer Security (TLS) Authorization Extensions," Request for Comments: 5878, Experimental, May 2010, 19 pages.

Kato, A., et al., "Camellia Cipher Suites for TLS," Request for Comments: 5932, Standards Track, Jun. 2010, 7 pages.

Eastlake, E., "Transport Layer Security (TLS) Extensions: Extension Definitions," Request for Comments: 6066, Standards Track, Jan. 2011, 25 pages.

Tuexen, M., et al., "Datagram Transport Layer Security (DTLS) for Stream Control Transmission Protocol (SCTP)," Request for Comments: 6083, Standards Track, Jan. 2011, 10 pages.

Mavrogiannopoulos, N., and D. Gillmor, "Using OpenPGP Keys for Transport Layer Security (TLS) Authentication," Request for Comments: 6091, Informational, Feb. 2011, 9 pages.

Turner, S., and T. Polk, "Prohibiting Secure Sockets Layer (SSL) Version 2.0," Request for Comments: 6176, Standards Track, Mar. 2011, 4 pages.

Igoe, K., and D. Stebila, "X.509v3 Certificates for Secure Shell Authentication," Request for Comments: 6187, Standards Track, Mar. 2011, 17 pages.

Kim, W., et al., "Addition of the ARIA Cipher Suites to Transport Layer Security (TLS)," Request for Comments: 6209, Informational, Apr. 2011, 10 pages.

Igoe, K., "Suite B Cryptographic Suites for Secure Shell (SSH)," Request for Comments: 6239, Informational, May 2011, 15 pages.

Rescorla, E., and N. Modadugu, "Datagram Transport Layer Security Version 1.2," Request for Comments: 6347, Standards Track, Jan. 2012, 33 pages.

Kanno, S., and M. Kanda, "Addition of the Camellia Cipher Suites to Transport Layer Security (TLS)," Request for Comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.

McGrew, D., and D. Bailey, "AES-CCM Cipher Suites for Transport Layer Security (TLS)," Request for Comments: 6655, Standards Track, Jul. 2012, 8 pages.

Bider, D., and M. Baushke, "SHA-2 Data Integrity Verification for the Secure Shell (SSH) Transport Layer Protocol," Request for Comments: 6668, Standards Track, Jul. 2012, 6 pages.

Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

Atkinson, R., "Security Architecture for the Internet Protocol," Request for Comments: 1825, Standards Track, Aug. 1995, 23 pages.

Atkinson, R., "IP Authentication Header," Request for Comments: 1826, Standards Track, Aug. 1995, 14 pages.

Atkinson, R., "IP Encapsulating Security Payload (ESP)," Request for Comments: 1827, Standards Track, Aug. 1995, 13 pages.

Metzger, P., et al., "IP Authentication Using Keyed MD5," Request for Comments: 1828, Standards Track, Aug. 1995, 6 pages.

Karn, P., et al., "The ESP DES-CBC Transform," Request for Comments: 1829, Standards Track, Aug. 1995, 11 pages.

Dierks, T., et al., "The TLS Protocol Version 1.0," Request for Comments: 2246, Standards Track, Jan. 1999, 75 pages.

Kent, S., "Seurity Architecture for the Internet Protocol," Request for Comments: 2401, Standards Track, Nov. 1998, 62 pages.

Orman, H., "The Oakley Key Determination Protocol," Request for Comments: 2412, Informational, Nov. 1998, 56 pages.

Newman, C., "Using TLS with IMAP, POP5 and ACAP," Request for Comments: 2595, Standards Track, Jun. 1999, 16 pages.

Medvinsky, A., et al., "Addition of Kerberos Cipher Suites to Transport Layer Security (TLS)," Request for Comments: 2712, Standards Track, Oct. 1999, 7 pages.

Khare, R., et al., "Upgrading to TLS Within HTTP/1.1," Request for Comments: 2817, Standards Track, May 2000, 13 pages.

Rescorla, E., "HTTP Over TLS," Request for Comments: 2818, Informational, May 2000, 8 pages.

Hoffman, P., "SMTP Service Extension for Secure SMTP over Transport Layer Security," Request for Comments: 3207, Standards Track, Feb. 2002, 9 pages.

(56) References Cited

OTHER PUBLICATIONS

Chown, P., "Advanced Encryption Standard (AES) Ciphersuites for Transport Layer Security (TLS)," Request for Comments: 3268, Standards Track, Jun. 2002, 8 pages.
Polk, W., et al., "Algorithms and Identifiers for the Internet X.509 Public Key Infrastructure Certificate and Certificate Revocation List (CRL) Profile," Request for Comments: 3279, Standards Track, Apr. 2002, 26 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Schaad, J., et al., "Additional Algorithms and Identifiers for RSA Cryptography for Use in the Internet X.509 Public Key Infrastructure Certificate and Certificate Revocation List (CRL) Profile," Request for Comments: 4055, Standards Track, Jun. 2005, 24 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of Seed Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Lehtinen, S., and C. Lonvick, "The Secure Shell (SSH) Protocol Assigned Numbers," Request for Comments: 4250, Standards Track, Jan. 2006, 19 pages.
Ylonen, T., and C. Lonvick, "The Secure Shell (SSH) Protocol Architecture," Request for Comments: 4251, Standards Track, Jan. 2006, 28 pages.
Ylonen, T., and C. Lonvick, "The Secure Shell (SSH) Authentication Protocol," Request for Comments: 4252, Standards Track, Jan. 2006, 16 pages.
Ylonen, T., and C. Lonvick, "The Secure Shell (SSH) Transport Layer Protocol," Request for Comments: 4253, Standards Track, Jan. 2006, 30 pages.
Ylonen, T., and C. Lonvick, "The Secure Shell (SSH) Connection Protocol," Request for Comments: 4254, Standards Track, Jan. 2006, 23 pages.
Schlyter, J., and W. Griffin, "Using DNS to Securely Publish Secure Shell (SSH) Key Fingerprints," Request for Comments: 4255, Standards Track, Jan. 2006, 9 pages.
Cusack, F., and M. Forssen, "Generic Message Exchange Authentication for the Secure Shell Protocol (SSH)," Request for Comments: 4256, Standards Track, Jan. 2006, 12 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Galbraith, J., and P. Remaker, "The Secure Shell (SSH) Session Channel Break Extension," Request for Comments: 4335, Standards Track, Jan. 2006, 6 pages.
Bellare, M., et al., "The Secure Shell (SSH) Transport Layer Encryption Modes," Request for Comments: 4344, Standards Track, Jan. 2006, 12 pages.
Harris, B., "Improved Arcfour Modes for the Secure Shell (SSH) Transport Layer Protocol," Request for Comments: 4345, Standards Track, Jan. 2006, 5 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Friedl, M., et al., "Diffie-Hellman Group Exchange for the Secure Shell (SSH) Transport Layer Protocol," Request for Comments: 4419, Standards Track, Mar. 2006, 10 pages.
Harris, B., "RSA Key Exchange for the Secure Shell (SSH) Transport Layer Protocol," Request for Comments: 4432, Standards Track, Mar. 2006, 8 pages.
Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.
Leontiev, S., and D. Shefanovski, "Using the GOST R 34.10-94, GOST R 34.10-2001, and GOST R 34.11-94 Algorithms With the Internet X.509 Public Key Infrastructure Certificate and CRL Profile," Request for Comments: 4491, Standards Track, 19 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Galbraith, J. and R. Thayer, "The Secure Shell (SSH) Public Key File Format," Request for Comments: 4716, Nov. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Galbraith, J., et al., "Secure Shell Public Key Subsystem," Request for Comments: 4819, Standards Track, Mar. 2007, 18 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.

\* cited by examiner

IDENTIFICATION OF TRUSTED CERTIFICATES

BACKGROUND

Digital certificates are an important part of network security. Digital certificates provide two main functions. First, digital certificates provide a way for an entity to prove ownership of a public key. Second, digital certificates provide a way for a network entity such as a client, service, or network application, to prove the entity's identity. Certificate Authorities ("CAs") play an important role by validating the identity of entities that request digital certificates, and by issuing digital certificates to entities that the Certificate Authority ("CA") has validated. When a certificate authority issues a digital certificate, the certificate authority signs the digital certificate using a private key belonging to the certificate authority. A network client can verify the identity of a network service by requesting the digital certificate belonging to the network service. If the digital certificate provided by the network service is signed by the certificate authority, and the network client is configured to trust the certificate authority, the network client can verify the signatures on the digital certificate to confirm the identity of the network service.

Identifying a set of trusted certificate authorities is a difficult problem. Network clients can be configured to trust a particular certificate authority by identifying the particular certificate authority in a trust store. If a network client trusts a particular certificate authority, the digital certificates issued by the particular certificate authority will be trusted by the network client. Some applications, such as some web browsers, include trust stores with large numbers of certificate authorities, and each certificate authority can potentially issue thousands of digital certificates. As a result, it can be very difficult for a network client to identify which certificate authorities should be trusted or to specify which digital certificates issued by a particular authority should be trusted.

BRIEF DESCRIPTION OF THE DRAWINGS

Various embodiments in accordance with the present disclosure will be described with reference to the drawings, in which.

DETAILED DESCRIPTION

Figure 1:
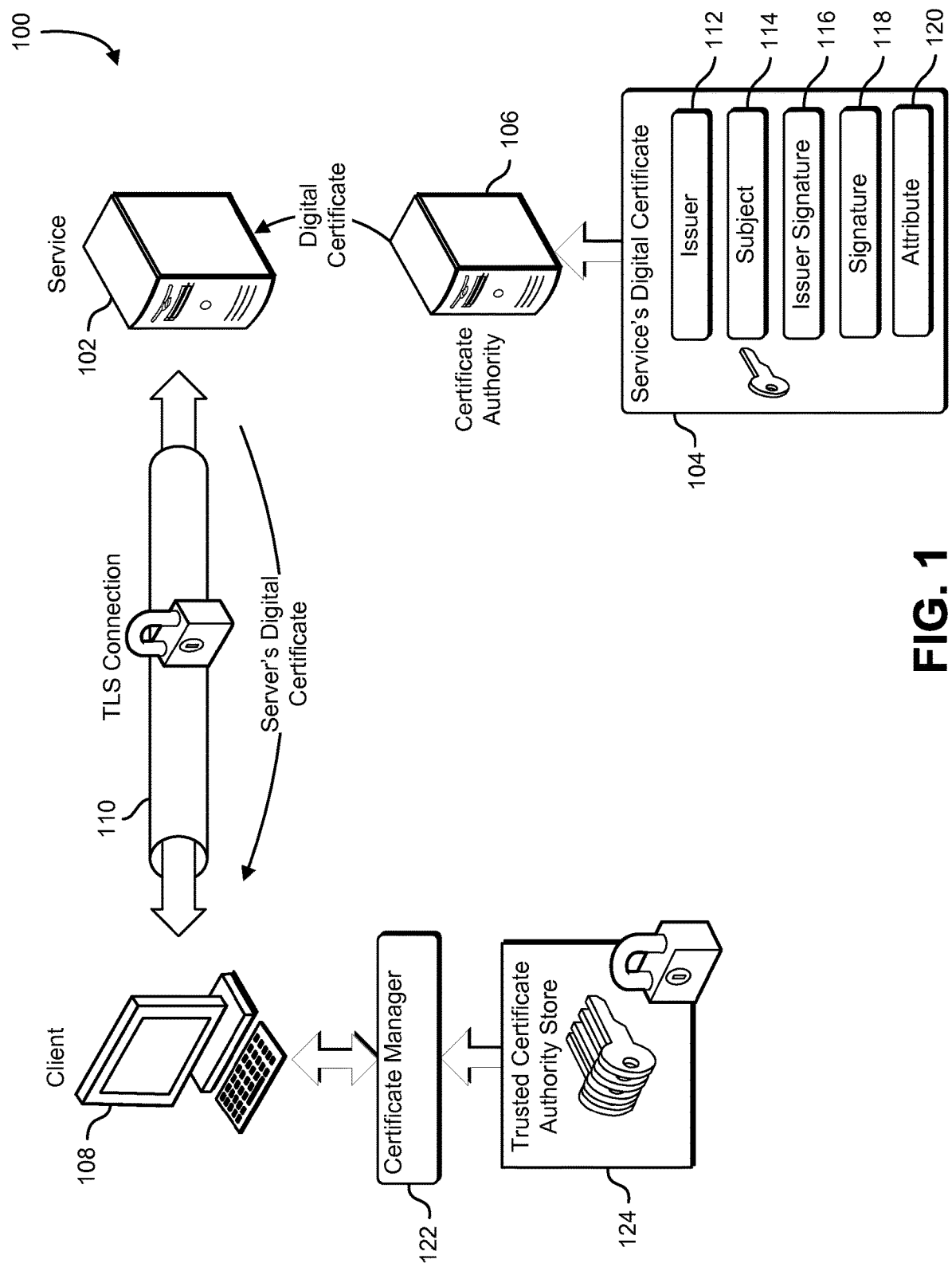
FIG. 1 shows an illustrative example of an environment in which various embodiments may be practiced.

The current document describes various systems and methods that allow a computer system, application program, network service, or other entity to adjust the set of potentially-trusted digital certificates by applying entity-specific rules to digital certificates presented for validation by the entity. In various examples, a client application running on a computer system initiates a secure network connection to a network service. In response to receiving the connection request, the network service provides a digital certificate to the client application so that the client application is able to verify the identity of the network service. The digital certificate includes a number of attributes that describe properties of the digital certificate, and properties of the owner of the digital certificate. The digital certificate is verified using a chain of trust that includes a number of digital signatures. The certificate is signed by the owner of the certificate, by a sequence of intermediate certificate authorities, and finally by a root certificate authority. The application verifies the information contained in the digital certificate by verifying the signatures in the chain of trust, and by verifying that the root certificate authority is represented in a trust store. A trust store contains a collection of trusted root certificates from certificate authorities that are trusted to identify third parties. When the new certificate authority is added to a trust store, an application that relies on the trust store has the potential to trust all certificates issued by the new certificate authority. In many environments, it is important to balance the benefit of adding an additional certificate authority to the trust store against the risk of trusting the certificates issued by the additional certificate authority.

A certificate manager provides a number of additional criteria that can be used to determine, at run time, whether to trust a particular digital certificate. The certificate manager may be a component that operates within the context of the application, or in some embodiments, the certificate manager may operate as a service on the computer system that hosts the application. The certificate manager maintains a set of rules that determine whether a particular digital certificate is trustworthy. In determining whether a particular digital certificate is trustworthy, the rules may examine the attributes of a particular digital certificate, the root certificate authority of the digital certificate, or the chain of trust of the digital certificate. Certain rules may restrict the set of trusted certificates issued by a particular certificate authority. Certain rules may define a subset of trusted root certificates from a trust store for use with a particular application. And certain rules may impose universal requirements on certificates presented to the particular application. By reducing the number of trusted root certificates, and/or by reducing the number of certificates trusted by each trusted root certificate, the chances of the application trusting a compromised or forged certificate may be reduced.

The certificate manager can be used in coordination with other systems for identifying trusted certificates. For example, many systems maintain a collection of trusted root certificate authority digital certificates in a trust store. When a digital certificate is validated, the root certificate authority of the digital certificate is identified and compared to the collection of digital certificates in the trust store. The digital certificate is trusted if the root certificate authority of the digital certificate is represented in the trust store. Some systems maintain more than one trust store. For example, some applications maintain an application-specific trust store using a process called certificate pinning. In certificate pinning, a set of trusted certificates is determined at compile time and built into an application. When used in coordination with a trust store, the certificate manager can reduce the set of potentially-trusted certificates, reducing the chance that a compromised digital certificate will be trusted.

The rules maintained by the certificate manager may be based on attributes of a subject digital certificate, attributes associated with certificate authorities in the chain of trust of the subject digital certificate, or properties of the trust chain itself. In one example, a rule requires that, in order to be trusted by a particular application, digital certificates issued by a particular root certificate authority be signed using an approved signing algorithm. In another example, the rule requires that, in order to be trusted by a particular application, digital certificates issued by a particular root certificate authority may not be signed by an intermediate certificate authority. The certificate manager can maintain multiple sets of rules, each set of rules adapted to the requirements of a particular application. For example, a client application for a storage service can use a set of rules that restrict the set of trusted root certificate authorities to those certificate authorities that issue digital certificates to the storage service. In another example, a network service application can use a set of rules that requires clients to provide a certificate that is signed with a strong signature algorithm.

In some embodiments, the certificate manager uses custom attributes added to digital certificates to determine if a digital certificate is trustworthy. Custom attributes may be added to X.509 certificates using a type and value pair contained in a certificate extension field. In one example, a custom attribute is added to a digital certificate to indicate that the certificate authority has completed a supplemental process to verify the identity of the certificate owner. The custom attributed may be added by the issuing certificate authority or by the requesting entity prior to submission to the CA for signing. In another example, a custom attribute is added by the issuer of the digital certificate that provides additional identifying information about the certificate owner.

As part of determining whether a digital certificate is trustworthy, the certificate manager may compute a score that represents the level of trust for the digital certificate. The score can be determined based at least in part on a determined quality of the certificate authorities listed in the chain of trust of the digital certificate, the age of the digital certificate, the strength of the signature algorithms used in the digital certificate, as well as other factors. The score is compared to a minimum trust score threshold value which may be specific to the particular application requesting validation of the digital certificate. If the score is greater than the minimum trust threshold value, the certificate manager indicates to the application that the certificate is trustworthy. If the score is less than or equal to the minimum trust threshold value, the certificate manager indicates to the application that certificate is not trustworthy.

When the certificate manager determines that a digital certificate is not trustworthy, additional actions may be taken. In some examples, the certificate manager activates an alarm that indicates that suspect digital certificates are being presented to an application. An administrator that monitors the system can respond to the alarms by adjusting the rules, adjusting the threshold values used to evaluate the rules, or by taking other actions to counter a network attack.

The certificate manager may include a rule update component. The rule update component provides a way for the certificate manager to update the rules used to determine whether a particular certificate is trustworthy. The rules may be updated when a new application is installed on the computer system, additional certificate attributes become available, or security policies are modified. Rule updates may be provided to the rule update component over an out-of-band communication channel that relies on physical media such as a CD-ROM, USB memory stick, or flash memory card, or via a secure network connection that is secured with a pinned digital certificate or stored key maintained within the rule update component.

FIG. 1 shows an illustrative example of an environment in which various embodiments may be practiced. An environment 100 includes a service 102 that owns a service digital certificate 104 issued by a certificate authority 106. The service 102 may be hosted by a server computer system, or group of server computer systems. A client computer system 108 requests a secure connection to the service 102 via a TLS connection 110. In some embodiments, the TLS connection 110 may be replaced with a Virtual Private Network ("VPN") connection, Internet Protocol Security ("IPSec") connection, Secure Sockets Layer ("SSS") connection, or other secure network connection. In response to the request for a secure connection, the service 102 provides the client computer system 108 with the service digital certificate 104. The service digital certificate 104 is an X.509 digital certificate that includes an issuer field 112, a subject field 114, and an issuer signature 116, a subject signature 118. Various attribute fields 120 can describe the validity time period, signature algorithms used, serial number, and chain of trust associated with the service digital certificate 104.

The client computer system 108 examines the provided service digital certificate 104 to determine whether the provided service digital certificate 104 is valid. The client computer system 108 validates the digital signatures of the service digital certificate 104. If the digital signatures on the service digital certificate 104 are not valid, the client computer system 108 determines that the service digital certificate 104 is invalid, and terminates the TLS connection 110. If the digital signatures on the service digital certificate 104 are valid, the client computer system 108 provides the service digital certificate 104 to a certificate manager 122.

The certificate manager 122 examines the service digital certificate 104 and identifies a root certificate authority of the service digital certificate 104. The certificate manager 122 queries a trusted certificate authority store 124, and determines whether the root certificate authority of the service digital certificate 104 is represented in the trusted certificate authority store 124. If the root certificate authority of the service digital certificate 104 is not present in the trusted certificate authority store 124, the certificate manager 122 determines that the service digital certificate is not trusted and terminates the TLS connection 110. If the root certificate authority of the service digital certificate 104 is present in the trusted certificate authority store 124, the certificate manager 122 applies a set of rules to determine whether the service digital certificate is trusted.

The rules supplied by the certificate manager 122 may reduce the number of potentially-trusted digital certificates for the client computer system without substantially affecting the functionality of the system. In some examples, the certificate manager 122 applies system-specific or application-specific rules that reduce the number of trusted certificate authorities from the trusted certificate authority store 124. In another example, the certificate manager 122 applies rules that examine attributes of the service digital certificate 104 to identify and distrust certificates that use weak cryptographic signature algorithms. In yet another example, the certificate manager 122 examines custom attributes on the service digital certificate 104 to determine whether the service digital certificate 104 has passed an enhanced verification process imposed by the issuing root certificate authority. The certificate manager 122 may select rules based at least in part on attributes of an application program that provides a digital certificate for processing. Attributes of the application program may include the identity of the application program, a group to which the application program belongs, or a code signature on the application program. In some examples, different applications running on the same host computer system will be associated with different sets of rules applied by the certificate manager 122. As a result, different applications may have different sets of potentially trusted digital certificates.

In some embodiments, the certificate manager 122 is a service that executes on the client computer system 108. One or more applications that executes on the client computer system 108 may access the certificate manager 122 to analyze and identify potentially trustworthy digital certificates. The rules applied by the certificate manager 122 may be rules defined by an administrator of the client computer system 108 which apply to all applications hosted by the client computer system 108. In some implementations, the rules applied by the certificate manager 122 are specific to the application requesting evaluation of the digital certificate. For example, an application that accesses a particular network storage service may supply rules to the certificate manager 122 which limit the trusted certificate authorities to those necessary to access the network storage service. Another application that provides a network service may supply rules to the certificate manager 122 which require certificates provided by clients to be signed using signature algorithms from an approved list of signature algorithms.

In some embodiments, the certificate manager 122 is implemented as a component of an application program hosted by the client computer system 108. The rules used by the certificate manager 122 are installed with the installation of the application program. The certificate manager 122 may include an application-specific trust store containing root certificate authorities used by the application program. The root certificate authorities may be installed in the application-specific trust store by pinning the root certificate authorities when the application program is compiled, or by pinning the root certificate authorities upon first occurrence of each root certificate authority.

In some embodiments, the certificate manager 122 is implemented as a service that operates on the client computer system 108. The certificate manager 122 can provide certificate-management services to a plurality of applications and services hosted by the client computer system 108. The certificate manager 122 may maintain a plurality of rule sets. A particular rule set may be established for each application or service that uses the certificate manager 122. In some implementations, the certificate manager 122 may contain rule sets based on an application or service profile.

In another implementation, the certificate manager 122 maintains a hierarchy of rule sets that are combined to produce a set of rules for a particular application. The certificate manager 122 can maintain rule sets at the application level, application group level, and client device level. For example, if a particular application uses the services of the certificate manager 122, the certificate manager 122 can combine rules that are associated with the particular application, rules that are associated with the particular client computer system that hosts the particular application, and rules that are associated with an application group to which the particular application belongs.

In some examples, the certificate manager establishes a first set of criteria for a client computer system to trust a digital certificate. The first set of criteria may include global criteria for trusting a digital certificate such as validation of all signatures in the chain of trust for a trusted digital certificate. A second set of criteria for a digital certificate to be valid includes criteria that correspond to a particular application (e.g., by being specific to the application or a category or group that the application is a member of). The certificate manager applies the second set of criteria to determine whether the digital certificate is not trusted notwithstanding satisfaction of the first set of criteria.

Figure 2:
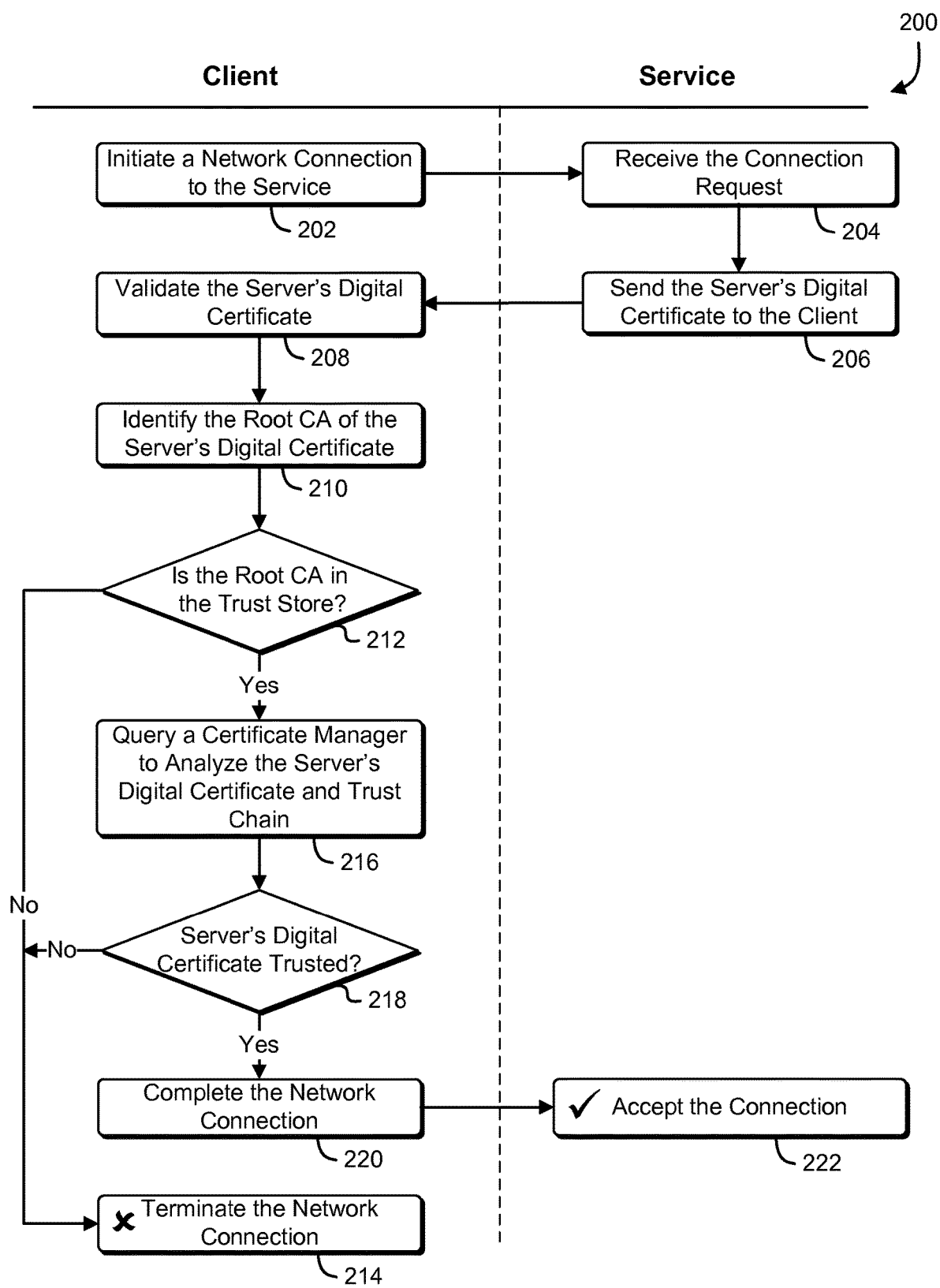
FIG. 2 shows an illustrative example of a process that, as a result of being performed by a client and a service, establishes a secure network connection based at least in part on a digital certificate that identifies the service, in accordance with an embodiment.

FIG. 2 shows an illustrative example of a process that, as a result of being performed by a client and a service, establishes a secure network connection based at least in part on a digital certificate that identifies the service, in accordance with an embodiment. A swim diagram 200 shows a process that begins at block 202 with the client initiating a secure connection to the service. The service receives the connection request from the client at block 204. In response to receiving the connection request from the client, the service sends 206 the service's digital certificate to the client as proof of the service's identity.

At block 208, the client validates the service's digital certificate. The service's digital certificate is validated at least in part by validating the digital signatures contained on the service's digital certificate. The digital signatures may include a signature generated by the service, a signature generated by a root certificate authority, and one or more signatures generated by intermediate certificate authorities. At block 210, the client identifies a root certificate authority of the service's digital certificate.

In various embodiments, one or more trust stores are maintained by the client. A trust store is a database that maintains a list of certificate authorities that the client is willing to trust with the task of issuing digital certificates with proper identifying information. When an entity approaches a trusted certificate authority and requests a digital certificate, the certificate authority verifies the identity of the entity and, if the identity of the entity matches the requested digital certificate, the certificate authority applies a signature of the certificate authority to the digital certificate and issues the digital certificate to the entity. In some examples, a number of trust stores may be maintained on a client computer system. Trust stores may be deployed by web browsers, Java runtimes, computer operating systems, computer applications, and application-update systems.

At block 212, the client examines the root certificate authority of the service's digital certificate, and determines whether the root certificate authority is represented in a trust store maintained by the client. If the root certificate authority is not represented in the trust store, execution proceeds to block 214 where the client terminates the network connection at least because the client is unable to definitively verify the identity of the service. If the root certificate authority is represented in the trust store, execution advances to block 216 and the client provides the service's digital certificate to a certificate manager.

The certificate manager performs additional tests on the service's digital certificate to determine whether the service's digital certificate is trustworthy. The service's digital certificate is trustworthy when the certificate manager determines that the client should trust the digital certificate. The tests performed by the certificate manager can be implemented with a set of rules maintained by the certificate manager. The rules maintained by the certificate manager may include rules that are adapted to a particular client of the certificate manager. For example, some rules may be adapted to process digital certificates received by a particular application. In another example, some rules may be adapted to process digital certificates received by a particular computer system. In yet another example, some rows may be adapted to process digital certificates received by a particular group or category of applications. Rules may be based on various attributes of digital certificates such as signature algorithm identifiers, validity periods, custom attributes defined in X.509 extensions, and the identities of certificate authorities in the chain of trust.

The certificate manager can be used to enforce rules that are evaluated at the time the digital certificate is presented to the certificate manager. In one example, a particular application acts as a client to a network service, and the network service uses digital certificates that are issued by numerous issuing certificate authorities. The particular application can use the certificate manager to reduce the number of potentially trusted digital certificates issued by the numerous issuing certificate authorities by deploying a rule in the certificate manager that identifies a common attribute of certificates associated with the network service. When the particular application receives a digital certificate from one of the numerous issuing certificate authorities, the certificate manager ensures that the common attribute is present as a condition of trusting the digital certificate.

As a result of applying the rules, the certificate manager indicates to the client whether the service's digital certificate is trusted. If the certificate manager indicates 218 to the client that the service's certificate is not trusted, execution proceeds to block 214 and the client terminates the network connection to the service. If the certificate manager indicates 218 to the client that the service's certificate is trusted, execution proceeds to block 220 and the client completes the network connection to the service because the information in the service's digital certificate has been determined to be valid. At block 222, the service accepts the network connection from the client and the client and the service can communicate over the network connection.

Figure 3:
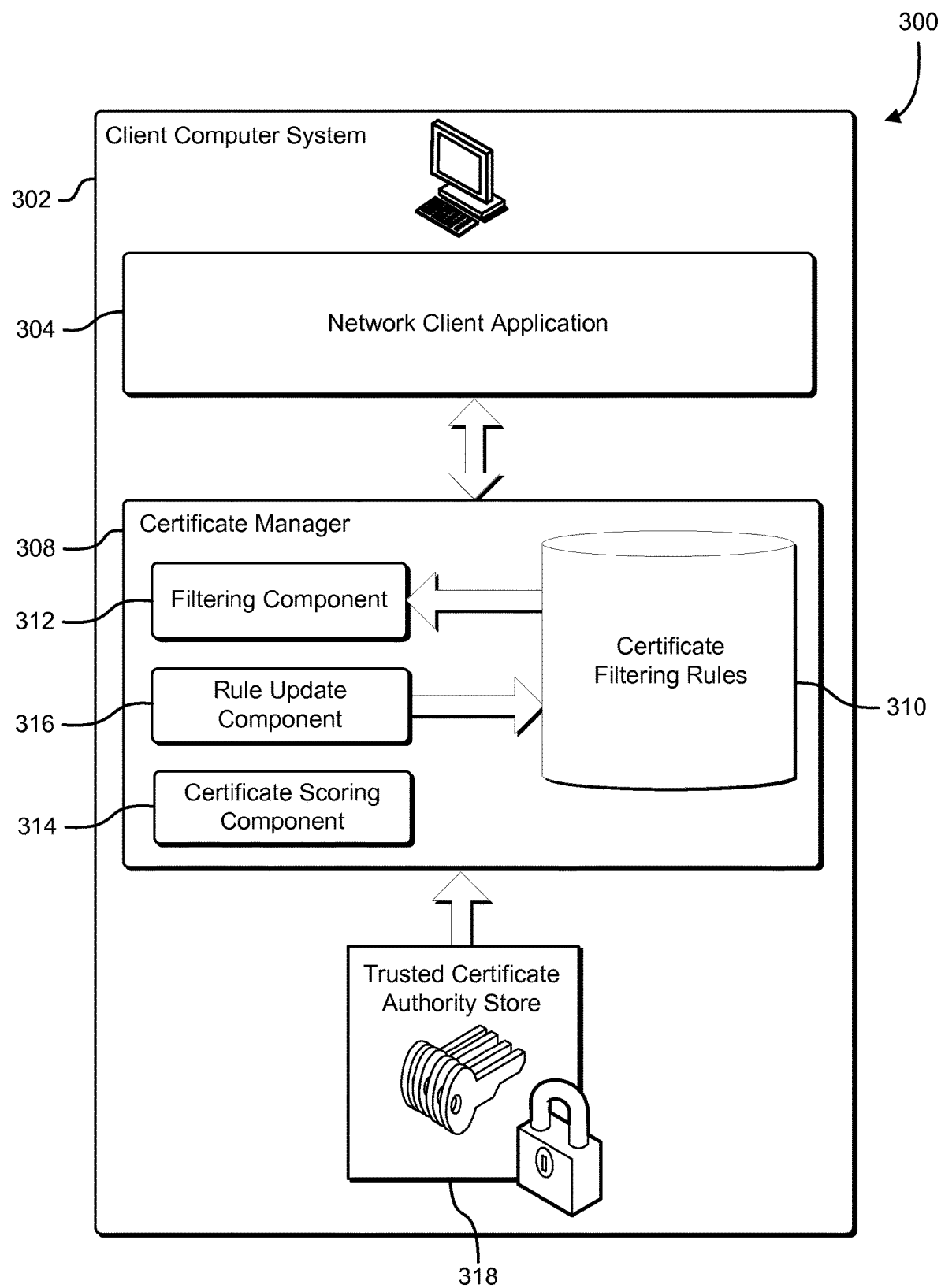
FIG. 3 shows an illustrative example of a client computer system that uses a certificate manager to determine whether or not to trust a subject digital certificate, in accordance with an embodiment.

FIG. 3 shows an illustrative example of a client computer system that uses a certificate manager to determine whether or not to trust a subject digital certificate, in accordance with an embodiment. A diagram 300 illustrates a client computer system 302. The client computer system 302 includes a network client application 304 that is hosted by the client computer system 302. The network client application 304 accesses a remote network service that supplies one or more digital certificates to the network client application 304 to verify the identity of various entities associated with a network service, and to secure communications between the network service and the network client application 304.

The client computer system 302 includes a certificate manager 308. The certificate manager 308 operates as a service within the client computer system 302, and may provide trusted-certificate identification services to additional applications hosted by the client computer system 302 in addition to the network client application 304. The certificate manager 308 maintains a set of certificate filtering rules 310. The certificate filtering rules 310 are accessed by a filtering component 312 that applies the filtering rules to digital certificates presented to the certificate manager 308 by the network client application 304.

In some embodiments, the certificate manager 308 is implemented on a network device that monitors connections between an application and a service. The certificate manager 308 examines digital certificates passed between the application and the service, applies the certificate filtering rules 310, and performs a number of actions upon determining that a particular certificate is not trustworthy. In some examples, the certificate manager terminates the connection between the application and the service. In another example, the certificate manager sends an alert to an administrator indicating that suspect digital certificates are being used.

In some examples, the certificate manager 308 includes a certificate scoring component 314. The certificate scoring component 314 calculates a trust score for a digital certificate based on a number of characteristics of the digital certificate such as the quality of the certificate authorities in the trust chain of the digital certificate, the strength of signature algorithms used to generate the signatures on the digital certificate, the time since the digital certificate was issued or updated, custom attributes present on the digital certificate, and the identity of the subject of the digital certificate. In some embodiments, the score of the digital certificate is determined by combining scores determined for the root certificate authority of the digital certificate, the intermediate certificate authorities in the trust chain of the digital certificate, and the digital certificate itself.

The certificate manager 308 may include a rule update component 316. The rule update component 316 can be used to manager the certificate filtering rules 310. For example, if a new application is installed on the client computer system 302, additional rules associated with the new application can be added to the certificate manager 308 by submitting the additional rules to the rule update component 316. The rule update component 316 provides an application programming interface ("API") that can be accessed by an administrative console to manage the certificate filtering rules 310.

The certificate manager 308 is configurable to operate in coordination with existing certificate management systems such as a trusted certificate authority store 318. The trusted certificate authority store 318 retains a collection of certificate authorities that are trusted by the client computer system 302 to issue digital certificates with correct identifying information. The collection of certificate authorities may be installed as part of a web browser, language runtime library, or operating system, and may be managed by an entity other than the entity that manages the certificate filtering rules 310.

In one example, the network client application 304 connects to an online network service and is provided with a digital certificate. The network client application 304 provides the digital certificate to the certificate manager 308. The certificate manager 308 examines the digital certificate and identifies a root certificate authority for the digital certificate. The certificate manager queries the filtering component 312 which examines the certificate authorities represented in the trusted certificate authority store 318. If the root certificate authority of the digital certificate is not represented in the trusted certificate authority store 318, the certificate manager 308 indicates to the network client application 304 that the digital certificate is not trustworthy. The filtering component 312 can apply additional rules that restrict the number of acceptable trusted certificate authorities in the trusted certificate authority store 318. If the filtering component 312 determines that the root certificate authority of the digital certificate is not acceptable, the certificate manager 308 will indicate to the network client application 304 that the digital certificate is not trustworthy notwithstanding the presence of the root certificate authority in the trusted certificate authority store 318. The filtering component 312 may apply additional rules to the digital certificate that evaluate attributes of the digital certificate, attributes of the root certificate authority of the digital certificate or attributes of the trust chain associated with a digital certificate to determine whether the certificate manager 308 should indicate to the network client application 304 that the digital certificate is trustworthy.

In some implementations, whether the digital certificate is trustworthy is determined at least in part by determining a trust score for the digital certificate. The certificate scoring component 314 evaluates various attributes of the digital certificate, attributes of the root certificate authority associated with the digital certificate, and characteristics of the trust chain of the digital certificate to determine a trust score. If the trust score associated with the digital certificate exceeds a threshold value, the certificate manager 308 indicates to the network client application 304 that the digital certificate is trustworthy. If the trust score associated with the digital certificate is less than or equal to the threshold value, the certificate manager 308 indicates to the network client application 304 that the digital certificate is not trustworthy. In some examples, the threshold value is set by an administrator for the client computer system 302. In another example, the threshold value is supplied by the network client application 304. In yet another example, the threshold value may be provided by a network service. The network service can provide particular threshold values to a certificate manager based at least in part on the particular applications and client computer systems serviced by the certificate manager.

In some embodiments, the certificate manager 308 applies the certificate filtering rules 310 while the application is offline. A preprocessed certificate trust score is generated by applying the certificate filtering rules to the trusted certificate authority store 318, and the application then uses the preprocessed certificate trust store as a root trust store for the application. In another embodiment, the certificate manager proactively contacts a number of network entities and evaluates the digital certificates provided by the network entities. If the certificate manager determines that a digital certificate associated with the number of network entities is not trustworthy, an alarm is triggered to alert an administrator to the potential problem.

Figure 4:
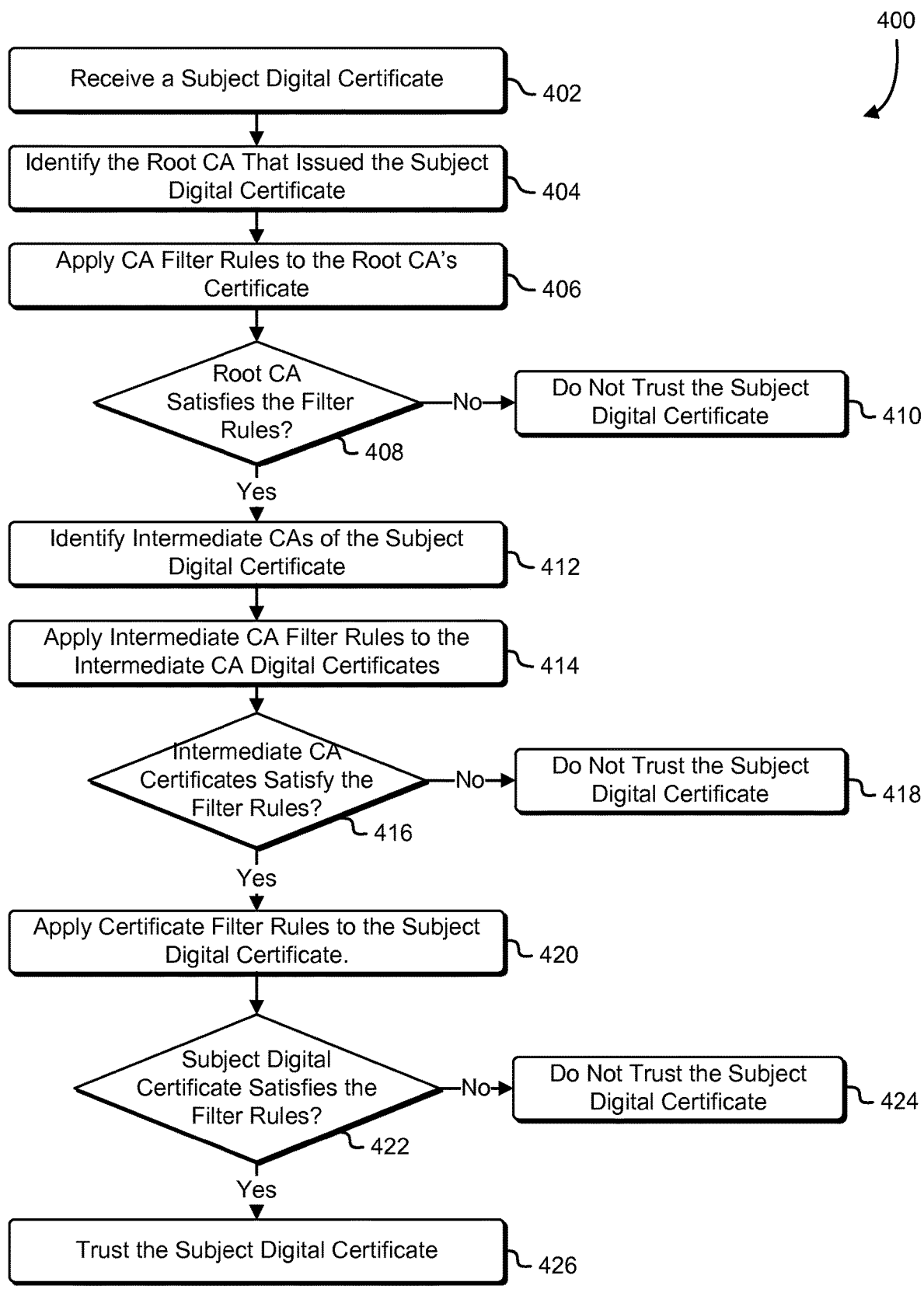
FIG. 4 shows an illustrative example of a process that, as a result of being performed by a certificate manager, determines whether or not to trust a subject digital certificate based at least in part on a set of rules maintained by a certificate manager, in accordance with an embodiment.

FIG. 4 shows an illustrative example of a process that, as a result of being performed by a certificate manager, determines whether or not to trust a subject digital certificate based at least in part on a set of rules maintained by a certificate manager, in accordance with an embodiment. A diagram 400 begins at block 402 with a certificate manager receiving a subject digital certificate. The subject digital certificate may be provided by a client computer system, an application program, or a network service. The subject digital certificate includes a number of signatures that form a chain of trust ending with a root certificate authority that, in many implementations, is self-signed. At block 404, the certificate manager identifies a root certificate authority for the subject digital certificate. At block 406, the certificate manager identifies a set of root-CA-filtering rules that define a set of allowable root certificate authorities, and which are based at the least in part on the identity of the entity that provided the subject digital certificate. The certificate manager applies the set of root-CA-filtering rules to the certificate of the root certificate authority. If the certificate manager determines 408 that the root certificate authority does not satisfy the root-CA-filtering rules, execution proceeds to block 410 and the certificate manager indicates that the subject digital certificate is not trustworthy. If the certificate manager determines 408 that the root certificate authority satisfies the root-CA-filtering rules, execution proceeds to block 412.

At block 412, the certificate manager identifies a set of intermediate certificate authorities that are in the trust chain of the subject digital certificate. At block 414, the certificate manager identifies a set of intermediate-CA-filtering rules that define a set of allowable intermediate certificate authorities, and which are based at least in part on the identity of the entity that provided the subject digital certificate. The certificate manager applies the set of intermediate-CA-filtering rules to the set of intermediate certificate authorities. If the certificate manager determines 416 that the intermediate certificate authorities do not satisfy the intermediate-CA-filtering rules, execution proceeds to block 418 and the certificate manager indicates that the subject digital certificate is not trustworthy. If the certificate manager determines 416 that the intermediate certificate authorities satisfy the intermediate-CA-filtering rules, execution advances to block 420.

At block 420, the certificate manager identifies a set of subject rules that are applicable to the subject certificate, and applies the subject rules to the subject certificate. If the certificate manager determines 422 that the subject digital certificate does not satisfy the set of subject rules, execution proceeds to block 424 and the certificate manager indicates that the subject digital certificate is not trustworthy. If the certificate manager determines 422 that the subject digital certificate satisfies the set of subject rules, execution proceeds to block 426 and the certificate manager indicates that the subject digital certificate is trustworthy.

In determining inapplicable set of rules to apply to a particular subject certificate, intermediate certificate authority, or root certificate authority, several criteria may be applied. In various examples, the identity of the entity that supplies the subject digital certificate to the certificate manager may be used to identify rules that are applicable to the subject digital certificate. In some implementations, various entities use the services of the certificate manager belong to security groups, and the certificate manager maintains sets of rules that apply to members of particular security groups. In another implementation, the certificate manager maintains rules that apply to a particular host computer system. Applications, services, and operating system components that utilize the certificate manager and which are hosted on a particular computer system are subject to rules placed in the certificate manager by the administrator of the particular computer system.

In some embodiments, the certificate manager may calculate a numerical score that represents the trustworthiness of a subject digital certificate as part of determining whether the subject digital certificate is trustworthy. The numerical score is compared to a threshold value that can be set by a system administrator, or provided by an entity that submits a subject digital certificate to the certificate manager. If the numerical score is greater than the threshold value, the subject digital certificate may be trusted. If the numerical score is less than or equal to the threshold value, the subject digital certificate may not be trusted.

Figure 5:
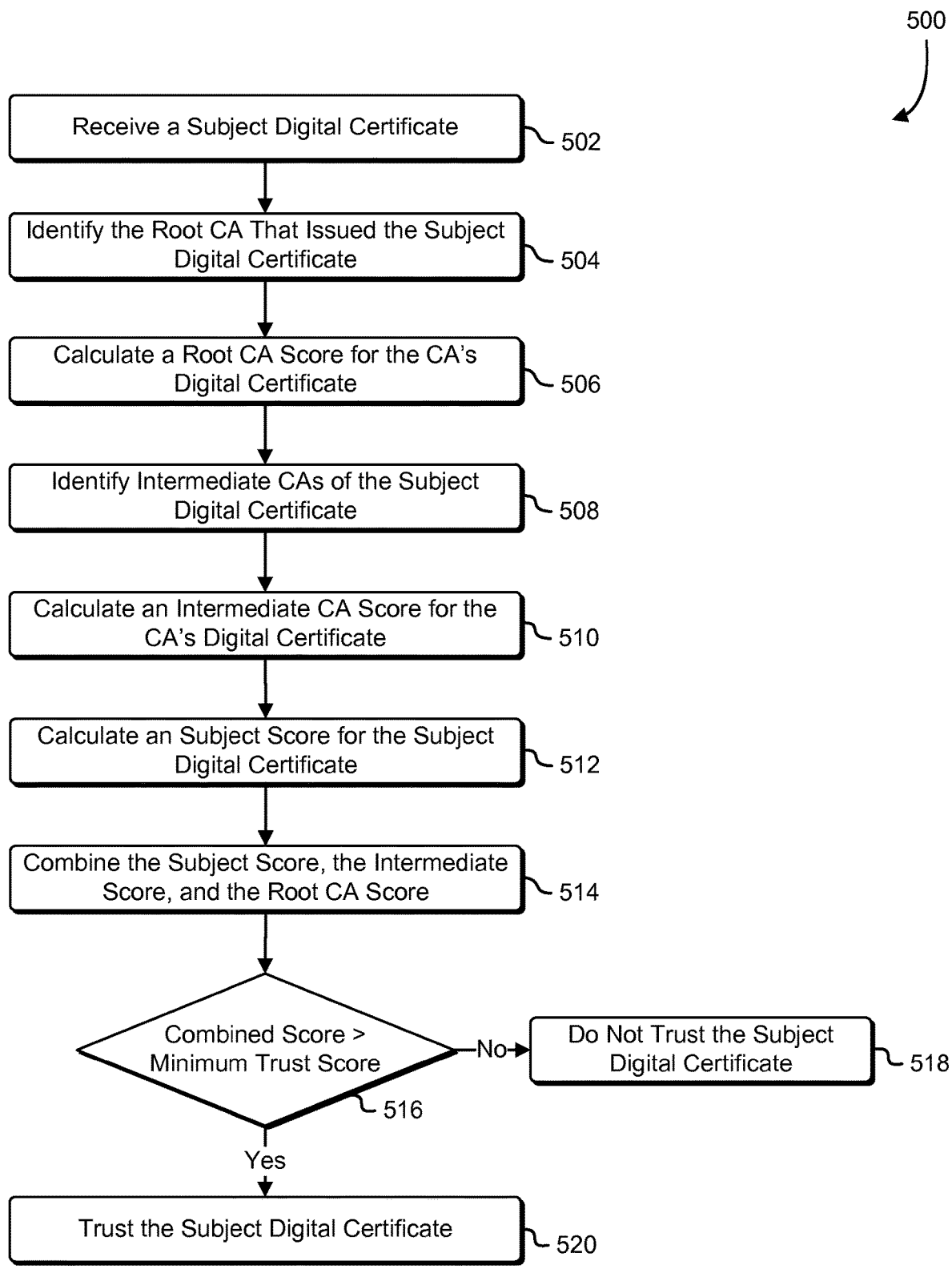
FIG. 5 shows an illustrative example of a process that, as a result of being performed by a certificate manager, determines whether or not to trust the digital certificate based on a score of the subject digital certificate and a score of an issuing certificate authority's digital certificate, in accordance with an embodiment.

FIG. 5 shows an illustrative example of a process that, as a result of being performed by a certificate manager, determines whether or not to trust the digital certificate based on a score of the subject digital certificate and a score of an issuing certificate authority's digital certificate, in accordance with an embodiment. A process diagram 500 illustrates a process that begins at block 502 where certificate manager receives a subject digital certificate from an entity. At block 504, the certificate manager identifies a root certificate authority that is associated with the subject digital certificate. The certificate manager retrieves a digital certificate associated with the root certificate authority, and at block 506, the certificate manager calculates a root-trust score for the root certificate authority's digital certificate.

The root-trust score may be determined using a number of methods. In one example, a lookup table provides a base trust value using the name of the root certificate authority as an index. The base trust value can be modified based on other attributes of the root certificate authority. For example, a measure of algorithm strength can be assigned to each signature algorithm identifier in the digital certificate of the root certificate authority by using lookup table with an index derived from the algorithm identifiers. The trust score of the root certificate authority is modified based on the score of the signature algorithms used by the root certificate authority. If the digital certificate of the root certificate authority includes signatures that are created with weak signature algorithms, the trust score of the root certificate authority is reduced. If the digital certificate of the root certificate authority include signatures that are created with strong signature algorithms, the trust score of the root certificate authorities increased.

At block 508, the certificate manager identifies a number of intermediate certificate authorities that make up a trust chain of the subject digital certificate. The certificate manager calculates 510 an intermediate-CA score based on characteristics of the digital certificates associated with the individual members of the trust chain, as well as characteristics of the trust chain itself. For example, the certificate manager may increase the intermediate-CA score as the number of intermediate certificate authorities in the trust chain decreases, and decrease the intermediate-CA score when the number of intermediate certificate authorities and the trust chain increases. In one implementation, the certificate manager subtracts an incremental amount from the intermediate-CA score for each intermediate certificate authority in excess of two.

At block 512, the certificate manager calculates a subject score for the subject digital certificate. The subject score may be determined using the techniques described above. In one example, the subject score is determined, in part, by examining the amount of elapsed time since the subject digital certificate was updated or issued. If the subject digital certificate was issued less than a minimum amount of time in the past, the subject score is reduced by an incremental amount. If the time since the digital certificate was last updated exceeds a threshold maximum time, the subject score may be reduced. In some implementations, the subject score is reduced by an amount proportional to the amount of time by which the time since digital certificate was last updated exceeds the threshold maximum time.

At block 514, the certificate manager combines the subject score, the intermediate-CA score, and the root-trust score to form a combined score. The combined score may be created in a variety of ways. In some implementations, the combined score is created by adding the intermediate-CA score, the root-trust score, and the subject score. In another implementation, the combined score is created by determining a weighted average of the subject score, the intermediate-CA score, and the root-trust score. In yet another implementation, the combined score is created by multiplying the subject score, the intermediate-CA score, the root-trust score, and a scaling factor.

The certificate manager compares the combined score to a minimum trust score to determine whether the subject digital certificate is trustworthy. At decision block 516, if the combined score is not greater than the minimum trust score, execution proceeds to block 518 and the certificate manager indicates that the subject digital certificate is not trustworthy. If the combined score is greater than the minimum trust score, execution proceeds to block 520 and the certificate manager indicates that the subject digital certificate is trustworthy.

Figure 6:
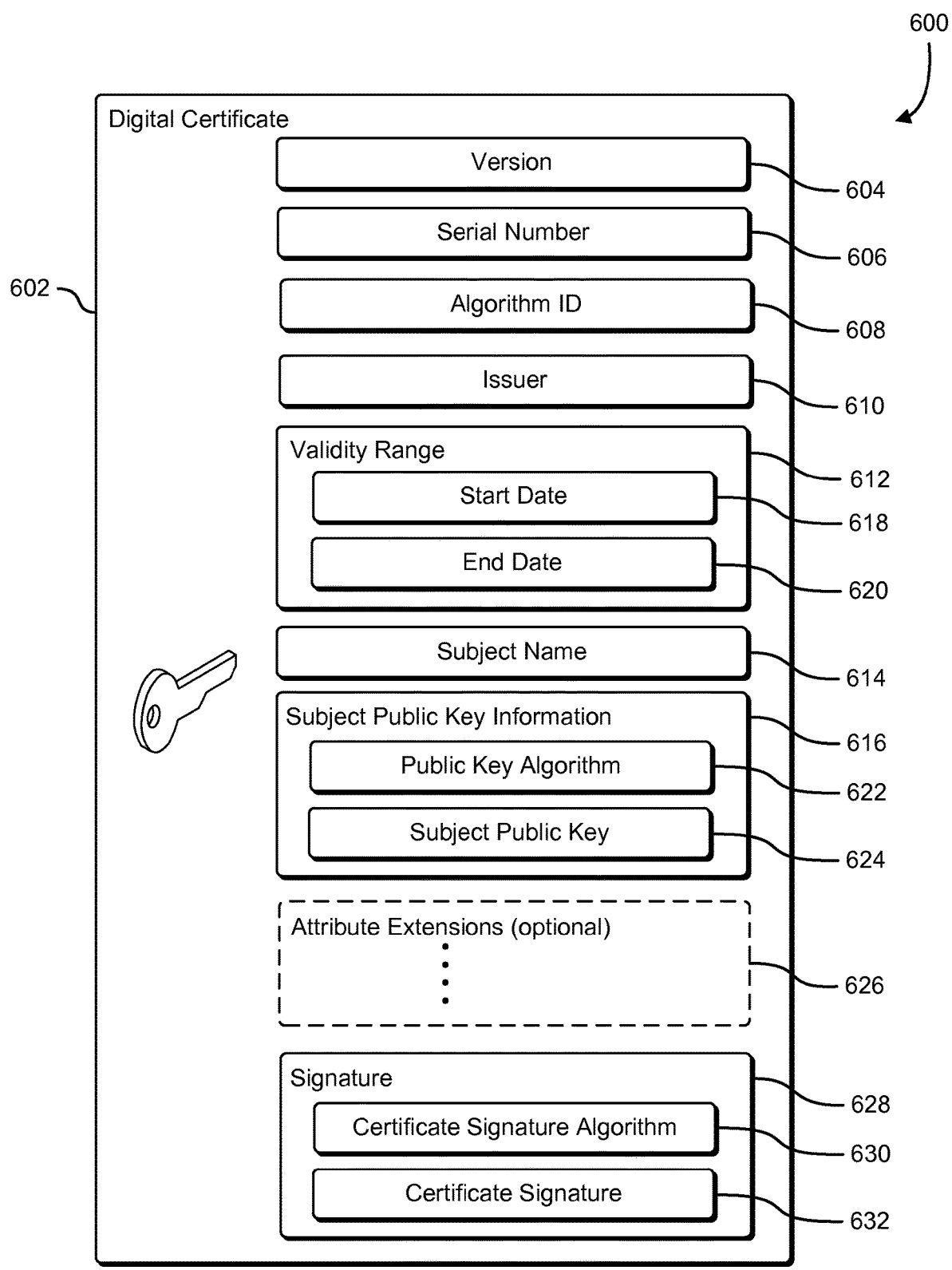
FIG. 6 shows an illustrative example of a digital certificate that includes attributes and optional attribute extensions that may be used to determine whether the digital certificate is trusted, in accordance with an embodiment.

FIG. 6 shows an illustrative example of a digital certificate that includes attributes and optional attribute extensions that may be used to determine whether the digital certificate is trusted, in accordance with an embodiment. A diagram 600 illustrates the structure of a digital certificate 602, such as an X.509 digital certificate. The structure of an X.509 digital certificate is described in RFC 5280 which is hereby incorporated by reference. The digital certificate 602 includes a version field 604, a serial number field 606, an algorithm ID field 608, an issuer field 610, a validity range 612, a subject name 614, and subject public key information 616. The version field 604 describes the version of the structure of the digital certificate 602. For example, for an X.509 certificate the version field 604 can specify a version of 3 when extensions are used with the digital certificate 602. The serial number field 606 holds an identifier assigned by and issuing certificate authority that is unique to each issued certificate. An algorithm ID field 608 contains an algorithm identifier that specifies an algorithm that is used by the certificate authority to sign the digital certificate 602. Various signature algorithms are specified in RFC 3279, RFC 4055, and RFC 4491, which are herein incorporated by reference, but other signature algorithms may also be specified. The issuer field 610 identifies the entity that has signed and issued the digital certificate 602. The validity range 612 specifies a range of time for which the digital certificate 602 is valid. In one example, the validity range 612 specifies a start date 618, and an end date 620 for the validity period of the digital certificate 602. The subject name 614 identifies the entity associated with the public key identified in the subject public key information 616. The subject public key information 616 specifies a public key algorithm 622 and a subject public key 624. The public key algorithm 622 identifies the particular algorithm used to generate the subject public key 624. The public key algorithm 622 may be an algorithm specified in RFC 3279, RFC 4055, RFC 4491, or other cryptographic signature algorithm.

In various examples, the digital certificate 602 can include one or more optional extensions. A list of optional extensions 626 can include one or more extensions that define attributes usable by a certificate manager to determine whether the digital certificate 602 is trustworthy for a particular purpose. In one example, an attribute extension is added by an issuing certificate authority to indicate to the certificate manager that the issuing certificate authority has performed additional identity verification for the subject identified by the digital certificate 602. In another example, an attribute extension is provided that adds additional description of the subject of the digital certificate 602. In yet another example, the attribute extension is added to the digital certificate by the certificate owner before the digital certificate is submitted to a CA for signature.

The digital certificate 602 includes a signature 628. The signature 628 includes a certificate signature algorithm 630 and a certificate signature 632. The certificate signature algorithm 630 is an identifier that identifies an algorithm used to generate the certificate signature 632. The algorithm may be an algorithm specified in RFC 3279, RFC 4055, RFC 4491, or other cryptographic signature algorithm. The certificate signature 632 is generated by the entity identified by the subject name 614, using a private key associated with the subject public key information 616.

A certificate manager can apply rules that utilize any of the attributes shown for the digital certificate 602, as well as other X.509 certificate attributes. In addition, digital certificates may be extended to include additional attributes, and the additional attributes may be used by the certificate manager when evaluating rules to determine whether a particular digital certificate is trustworthy.

Figure 7:
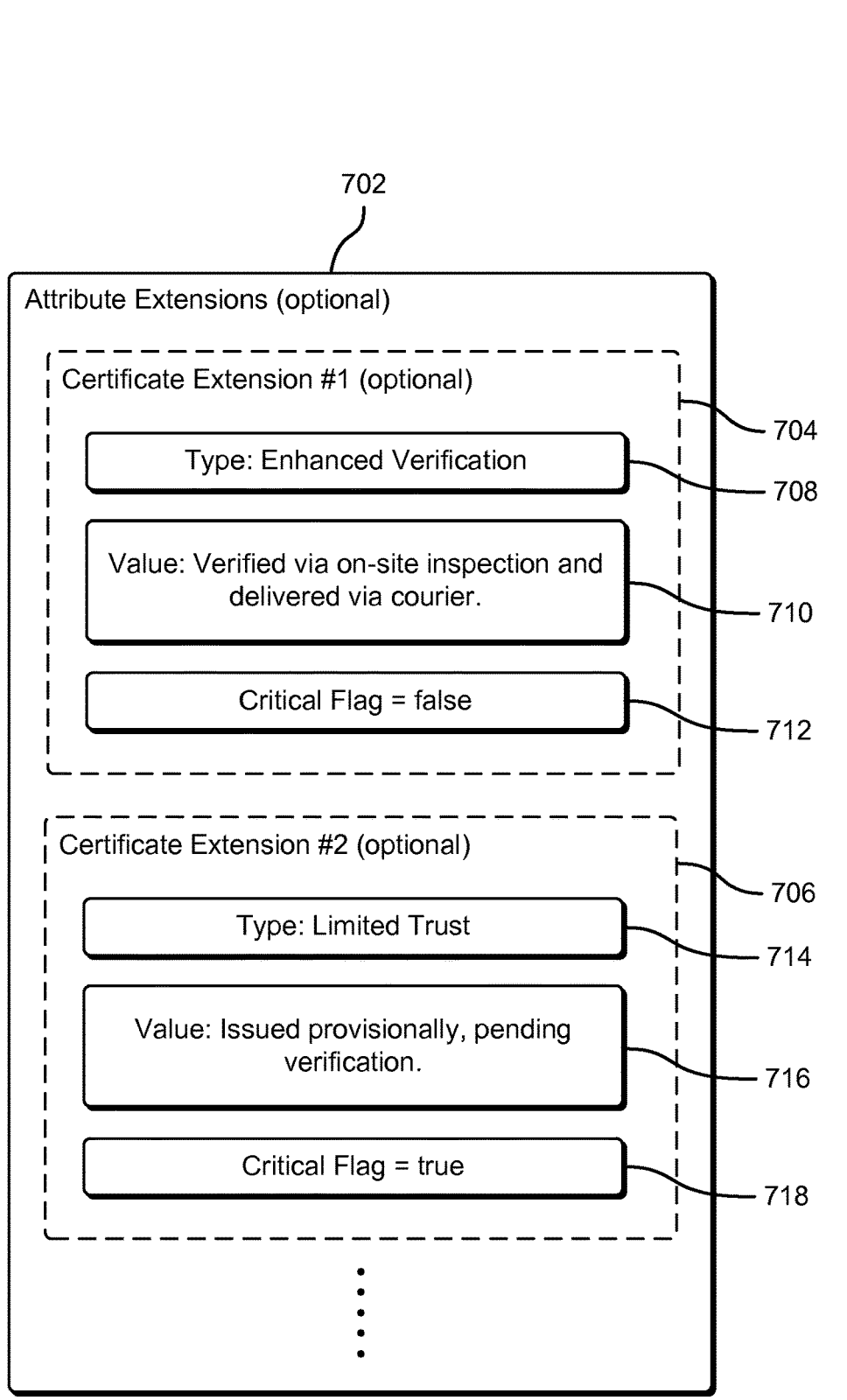
FIG. 7 shows an illustrative example of attribute extension fields that may be added to a digital certificate, in accordance with an embodiment.

FIG. 7 shows an illustrative example of attribute extension fields that may be added to a digital certificate, in accordance with an embodiment. A diagram 700 illustrates the structure of an attribute extension 702 to a digital certificate. The attribute extension 702 includes a first certificate extension 704 and a second certificate extension 706.

The first certificate extension 704 includes a first type field 708, a first value field 710, and a first critical flag 712. In the illustrated example, the first type field 708 specifies that the first certificate extension 704 is an enhanced verification attribute. The first value field 710 describes the enhanced verification process. The first critical flag 712 is set to a value of false. When a critical flag is set to a value of false, the recipient of a digital certificate need not understand or process the information in the extension.

The second certificate extension 706 includes a second type field 714, a second value field 716, and a second critical flag 718. The second type field 714 indicates that the second certificate extension 706 is a limited-trust attribute. The second value field 716 describes the reason for the limitation. In the illustrated example, the reason for limitation is that the certificate is issued provisionally and is pending verification. The second critical flag 718 is set to true. By setting the critical flag to true, a recipient of the digital certificate must understand and process the information in the extension, or reject the digital certificate.

A certificate manager may be configured to process various X.509 attributes, including attributes added to an X.509 certificate using optional extensions as shown in FIGS. 6 and 7.

Figure 8:
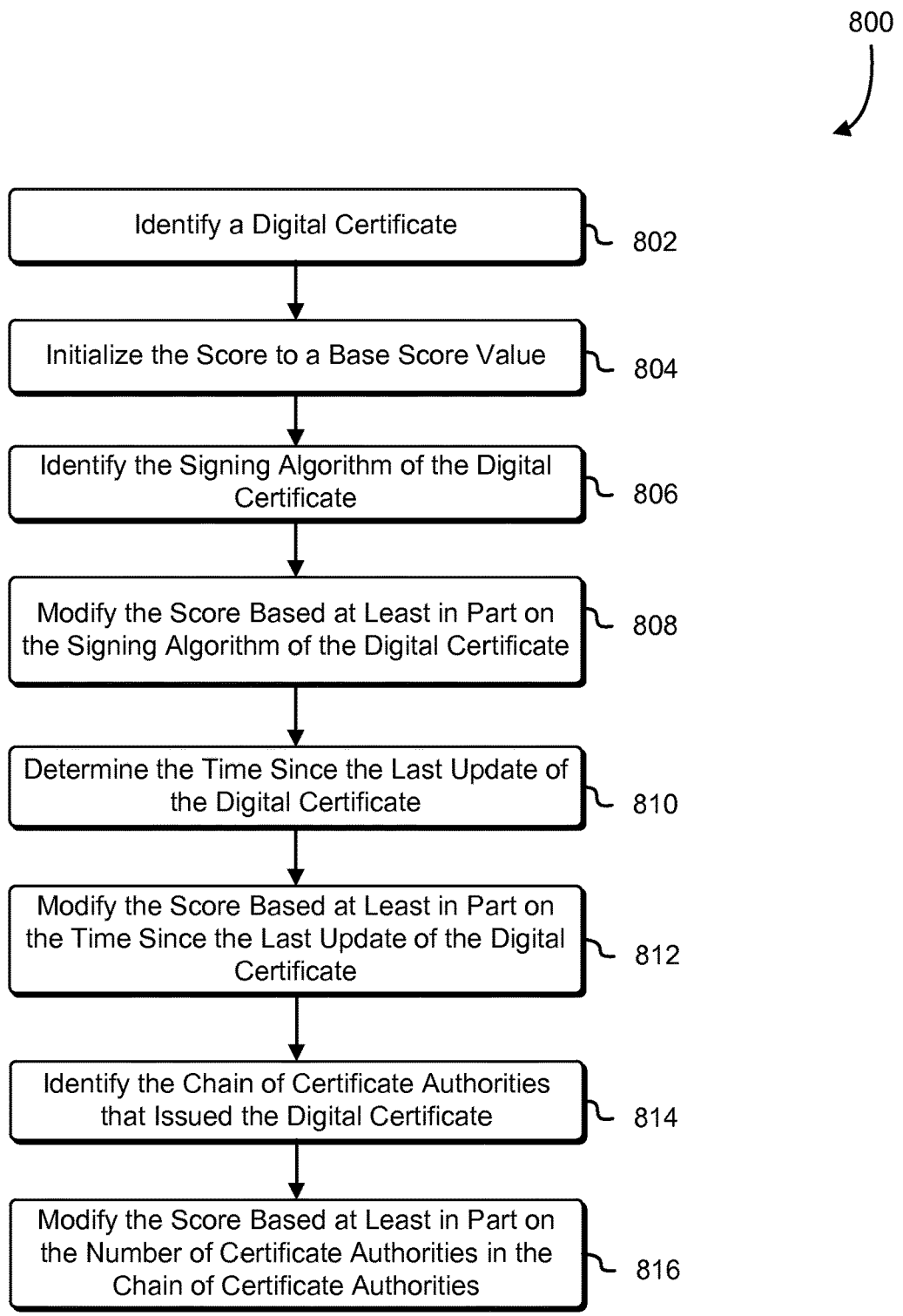
FIG. 8 shows an illustrative example of a process that, as a result of being performed by a certificate manager, determines a score for a subject digital certificate.

FIG. 8 shows an illustrative example of a process that, as a result of being performed by a certificate manager, determines a score for a subject digital certificate. A process diagram 800 illustrates a process that begins at block 802 with a certificate manager identifying a digital certificate for which to compute a score. At block 804, the certificate manager initializes the score to an initial base score value. In some examples, the initial base score value is zero. In other examples, the initial base score value is 100. At block 806, the certificate manager identifies a signing algorithm used by the subject of the digital certificate. The certificate manager modifies 808 the score based at least in part on the identified signing algorithm. In some implementations, the certificate manager acquires a modification value by extracting a value from a lookup table that is indexed using algorithm identifiers and that contains values that are proportional to the strength of various signature algorithms that are specified by the index. For example, if the signing algorithm identifier has a numerical value of 10, the certificate manager extracts the $10^{th}$ value from the table thereby obtaining a numerical indication of the strength or weakness of the signing algorithm.

At block 810, the certificate manager identifies the time since last update of the digital certificate. The time since the last update of the digital certificate may be measured by examining the validity period of the digital certificate. The validity period of the digital certificate includes two values, a validity start time, and a validity and time. At block 812, the score of the digital certificate is modified based at least in part on the validity start time. If the time since the validity start time exceeds a threshold value, the score for the subject digital certificate is decreased. In some implementations, the score for the subject digital certificate is decreased by a fixed amount. In another implementation, the score for the subject digital certificate is decreased by an amount proportional to the amount of time that the threshold value is exceeded.

At block 814, the certificate manager identifies the trust chain of certificate authorities that have signed the digital certificate. The score is modified 816 based on the properties of the members of the trust chain, as well as the properties of the trust chain itself. For example, the score may be modified based on the number of members and trust chain. When the number of members in the trust chain exceeds a threshold value, the score for the digital certificate can be decreased. In some implementations, a score can be computed for each certificate authority in the trust chain, and that the scores combined using any method described above for combining trust scores. In some examples, the trust score is calculated for each certificate authority in the trust chain and then averaged. In another example, the trust score for the entire trust chain is equal to the lowest trust score in the chain of certificate authorities.

Figure 9:
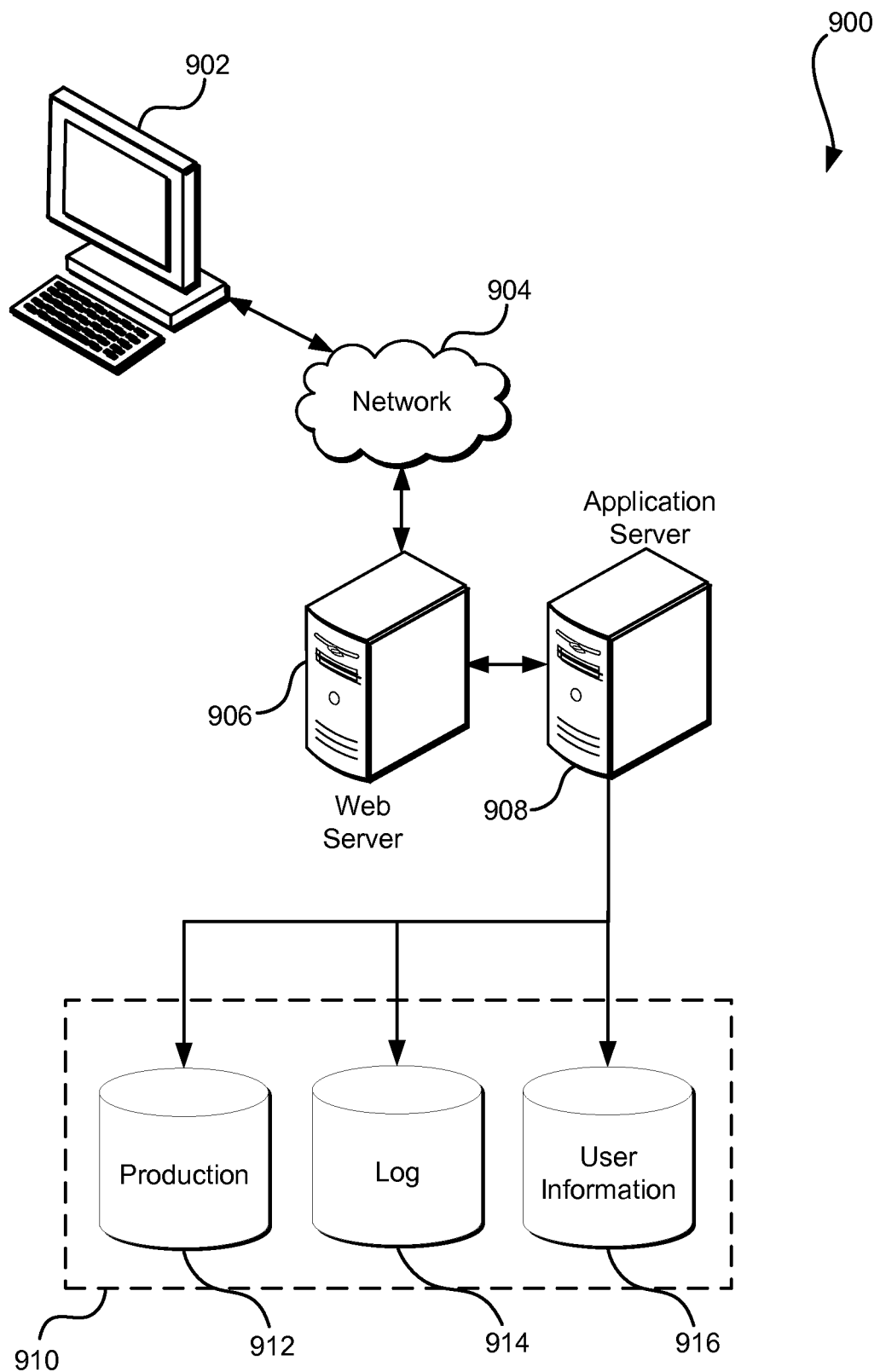
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, as a result of being executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake. Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described in this document may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    receiving a digital certificate at an application hosted on a client computer system that hosts a number of other applications;
    identifying a root certificate authority of the digital certificate;
    determining that the root certificate authority is in a trust store associated with the client computer system, the trust store usable by the number of other applications;
    selecting an application-specific rule based at least in part on an identity of the application, the application specific rule based at least in part on a number of signing entities in a chain of trust of the digital certificate;
    determining the number of signing entities in the chain of trust of the digital certificate;
    determining that the digital certificate is not trusted by the application by applying the application-specific rule to the digital certificate, notwithstanding the digital certificate being trusted by at least one of the other applications; and
    operating in accordance with the digital certificate not being trusted by the application while maintaining validity of the digital certificate for use by at least one of the other applications.

2. The computer-implemented method of claim 1, wherein:
    the application-specific rule identifies a subset of certificate authorities from the trust store; and
    applying the application-specific rule to the digital certificate determines that the root certificate authority of the digital certificate is represented in the subset of certificate authorities.

3. The computer-implemented method of claim 1, wherein:
    the application-specific rule identifies a set of acceptable signature algorithms that can be used to generate a digital signature; and
    applying the application-specific rule to the digital certificate determines that a signature algorithm used to generate the digital signatures on the digital certificate is represented in the set of acceptable signature algorithms.

4. The computer-implemented method of claim 1, wherein:
    the application-specific rule evaluates a custom attribute of the digital certificate; and
    the custom attribute of the digital certificate is defined in an X.509 certificate extension.

5. The computer-implemented method of claim 1, further comprising:
    receiving a second digital certificate at the application hosted on the client computer system;
    determining that signatures on the second digital certificate are valid;
    determining that a second root certificate associated with the second digital certificate is represented in the trust store;
    selecting, based at least in part on an attribute of the application, a second rule associated with the application;
    determining that the second digital certificate is not trusted by applying the second rule to the second digital certificate; and
    operating in accordance with the second digital certificate being not trusted.

6. A system comprising at least one computing device that implements a certificate management service, wherein the certificate management service:

receives, at an application, a digital certificate;
determines that the digital certificate is signed by a trusted certificate authority, the trusted certificate authority represented in a trust store maintained by the at least one computing device, the trust store usable by a plurality of applications hosted by the at least one computing device;
identifies a first rule that is applicable based at least in part on an identity of the application, the first rule based at least in part on a number of signing entities in a chain of trust of the digital certificate;
identifies the number of signing entities in the chain of trust;
determines that the digital certificate violates the first rule, the first rule being adapted to the application;
as a result of having determined that the digital certificate violates the first rule, indicates to the application that the digital certificate is not trustworthy; and
operates in accordance with the digital certificate not being trusted by the application while maintaining validity of the digital certificate for use by at least one other application of the plurality of applications.

7. The system of claim 6, wherein the certificate management service further:
determines that the digital certificate is in accordance with a second rule, the second rule being adapted to a group of applications to which the application belongs;
as a result of having determined that the digital certificate is not in accordance with the second rule, indicates to the application that the digital certificate is not trustworthy;
determines that the digital certificate is in accordance with a third rule, the third rule being adapted to a computer system that hosts the application; and
as a result of having determined that the digital certificate is not in accordance with the third rule, indicates to the application that the digital certificate is not trustworthy.

8. The system of claim 6, wherein:
the certificate management service further determines a score that represents a level of trust for the digital certificate; and
the first rule is based at least in part on the score.

9. The system of claim 6, wherein:
the certificate management service further determines an amount of time between a current time and a time the digital certificate was last updated; and
the first rule is based at least in part on the amount of time.

10. The system of claim 6, wherein:
the digital certificate includes a certificate extension that describes an attribute of the digital certificate; and
the first rule is based at least in part on the attribute.

11. The system of claim 6, wherein the certificate management service determines that the digital certificate violates the first rule at least by:
identifying a signature algorithm used to generate a signature by a root certificate authority on the digital certificate; and
determining that the signature algorithm is a weak signature algorithm that is not approved for signing the digital certificate.

12. The system of claim 6, wherein:
the application is hosted by a first computer system and a certificate manager is hosted by a second computer system different from the first computer system;
the certificate manager identifies the first rule that is applicable based at least in part on the identity of the application, the first rule selected from a plurality of rules for the plurality of applications;
the digital certificate is received from the application via a network connection; and
the certificate manager indicates to the application that the digital certificate is not trustworthy by sending a signed message to the application, the signed message including a digital signature generated using a private key associated with the certificate manager.

13. A non-transitory computer-readable storage medium having stored thereon executable instructions that, as a result of being executed by one or more processors of a computer system, cause the computer system to at least
determine whether a digital certificate received by an application is trustworthy by at least:
determining that the digital certificate is signed by a trusted certificate authority, the trusted certificate authority represented in a trust store maintained by the computer system, the trust store usable by a plurality of applications, including the application, hosted by the computer system;
obtaining a rule set based at least in part on an identity of the application, a particular rule of the set based at least in part on a number of signing entities in a chain of trust of the digital certificate;
performing, based at least in part on the particular rule in the rule set, an evaluation of a characteristic of the trusted certificate authority, the evaluation including, for the particular rule, determining the number of signing entities;
determining that the digital certificate is not trustworthy based at least in part on a result of the evaluation; and
operating in accordance with the digital certificate not being trusted by the application while maintaining validity of the digital certificate for use by one or more of the applications hosted by the computer system.

14. The non-transitory computer-readable storage medium of claim 13, wherein:
performing the evaluation is accomplished at least in part by determining a score that represents a level of trustworthiness associated with the digital certificate; and
determining that the digital certificate is not trustworthy is accomplished at least in part by comparing the score to a threshold value.

15. The non-transitory computer-readable storage medium of claim 14, wherein the threshold value is provided by the application.

16. The non-transitory computer-readable storage medium of claim 14, wherein:
the threshold value is a security setting associated with the computer system; and
the threshold value is configured via an administrative console.

17. The non-transitory computer-readable storage medium of claim 13, wherein:
performing the evaluation is accomplished at least in part by determining a number of certificate authorities in a trust chain associated with the digital certificate; and
determining that the digital certificate is not trustworthy is accomplished at least in part by comparing the number of certificate authorities to a threshold value.

18. The non-transitory computer-readable storage medium of claim 13, wherein:

performing the evaluation is accomplished at least in part by:
- identifying, within a lookup table, a base trust value for a root certificate authority associated with the digital certificate; and
- determining a final trust score for the digital certificate, the final trust score based at least in part on the base trust value; and determining that the digital certificate is not trustworthy is accomplished at least in part by comparing the final trust score to a threshold value.

19. The non-transitory computer-readable storage medium of claim 13, wherein:
- performing the evaluation is accomplished at least in part by examining the digital certificate that was signed by the trusted certificate authority; and
- the digital certificate including a certificate extension that certifies that the certificate authority performed an enhanced identity verification process as a result of signing the digital certificate.

* * * * *